US010469272B2

(12) United States Patent
Slik

(10) Patent No.: US 10,469,272 B2
(45) Date of Patent: Nov. 5, 2019

(54) METHODS FOR FACILITATING SECURE CLOUD COMPUTE ENVIRONMENTS AND DEVICES THEREOF

(71) Applicant: NetApp, Inc., Sunnyvale, CA (US)

(72) Inventor: David Slik, Northridge, CA (US)

(73) Assignee: NetApp, Inc., Sunnyvale, CA (US)

( * ) Notice: Subject to any disclaimer, the term of this patent is extended or adjusted under 35 U.S.C. 154(b) by 183 days.

(21) Appl. No.: 15/663,400

(22) Filed: Jul. 28, 2017

(65) Prior Publication Data

US 2019/0036713 A1 Jan. 31, 2019

(51) Int. Cl.
*H04L 9/32* (2006.01)
*H04L 9/08* (2006.01)
*H04L 9/14* (2006.01)
*H04L 9/30* (2006.01)

(52) U.S. Cl.
CPC .......... *H04L 9/3278* (2013.01); *H04L 9/0822* (2013.01); *H04L 9/0825* (2013.01); *H04L 9/14* (2013.01); *H04L 9/30* (2013.01)

(58) Field of Classification Search
CPC ....... H04L 9/3278; H04L 9/30; H04L 9/0822; H04L 9/14; H04L 63/1416; H04L 63/0227; H04L 63/1433; H04L 9/0825
See application file for complete search history.

(56) References Cited

U.S. PATENT DOCUMENTS

| 8,725,645 | B1* | 5/2014 | Montini | G06F 21/121 |
| | | | | 705/50 |
| 9,367,693 | B2* | 6/2016 | Kocher | G06F 21/602 |
| 2001/0053222 | A1* | 12/2001 | Wakao | H04N 21/234318 |
| | | | | 380/43 |
| 2002/0018565 | A1* | 2/2002 | Luttrell | H04N 7/1675 |
| | | | | 380/217 |
| 2007/0288765 | A1* | 12/2007 | Kean | G06F 21/76 |
| | | | | 713/193 |

(Continued)

OTHER PUBLICATIONS

Trimberger et al.; "FPGA Security: From Features to Capabilities to Trusted Systems", Jun. 2014, ACM, pp. 1-4. (Year: 2014).*

(Continued)

*Primary Examiner* — Matthew Smithers
(74) *Attorney, Agent, or Firm* — Pepper Hamilton LLP

(57) ABSTRACT

Methods, non-transitory computer readable media, and computing devices that facilitate secure cloud compute environments are disclosed. A secure application package (SAP) is encrypted with an SAP encryption key. The encrypted SAP is stored on cloud storage. A profiling bitstream is sent to a cloud provider. The profiling bitstream is configured to, when implemented by the HLD, generate and return a profile response, including a bitstream encryption key, which is encrypted with a public key. The profile response is decrypted using a private key and the bitstream encryption key is extracted. An application bitstream is sent to the cloud provider. The application bitstream is encrypted with the bitstream encryption key, includes the SAP encryption key, and is configured to, when implemented by the HLD, obtain the SAP from the cloud storage, decrypt the SAP using the SAP encryption key, and execute an application in a softcore included in the application bitstream.

18 Claims, 10 Drawing Sheets

(56) References Cited

U.S. PATENT DOCUMENTS

| | | | | |
|---|---|---|---|---|
| 2011/0179268 | A1* | 7/2011 | Strom | G06F 21/121 |
| | | | | 713/156 |
| 2013/0205063 | A1* | 8/2013 | Zhang | G06F 11/1415 |
| | | | | 711/102 |
| 2016/0099923 | A1* | 4/2016 | Golla | H04W 12/04 |
| | | | | 713/171 |
| 2016/0300070 | A1* | 10/2016 | Durham | G06F 21/6209 |
| 2016/0301676 | A1* | 10/2016 | Gounares | H04L 63/08 |
| 2016/0315762 | A1* | 10/2016 | Moon | H04L 9/065 |
| 2017/0012952 | A1* | 1/2017 | Cocchi | H04L 63/061 |

OTHER PUBLICATIONS

Horovitz et al.; "Protecting Partial Regions in FPGA Bitstreanns", 2017, IEEE, pp. 123-127. (Year: 2017).*
Fahny et al.; "Virtualized FPGA Accelerators for Efficient Cloud Computing", 2015, IEEE, pp. 430-435. (Year: 2015).*
Thanh et al., "A Framework for Secure Remote Updating of Bitstream on Runtime Reconfigurable Embedded Platforms", 2012 IEEE, pp. 471-476. (Year: 2012).*

* cited by examiner

US 10,469,272 B2

METHODS FOR FACILITATING SECURE CLOUD COMPUTE ENVIRONMENTS AND DEVICES THEREOF

FIELD

This technology relates to utilizing cloud resources and more particularly to methods and devices for facilitating secure cloud compute environments.

BACKGROUND

Increasingly, organizations are utilizing cloud resources for storage and to carry out computational tasks. Cloud-based computing offers many advantages including use-based costs, dynamic scalability, and reduced capital expenditures. Many cloud providers offer cloud clients the use of configurable or programmable hardware logic devices (e.g., field programmable gate arrays (FPGAs)) for relatively efficient performance of computational tasks.

However, use of cloud computing services can expose sensitive data to alteration and disclosure, resulting in reduced adoption or utilization of cloud-based resources with respect to sensitive workloads and misappropriation of sensitive data by malicious third parties. There is currently no effective way to facilitate secure cloud compute environments that are enabled by hardware logic devices hosted by cloud providers.

DETAILED DESCRIPTION

Figure 1:
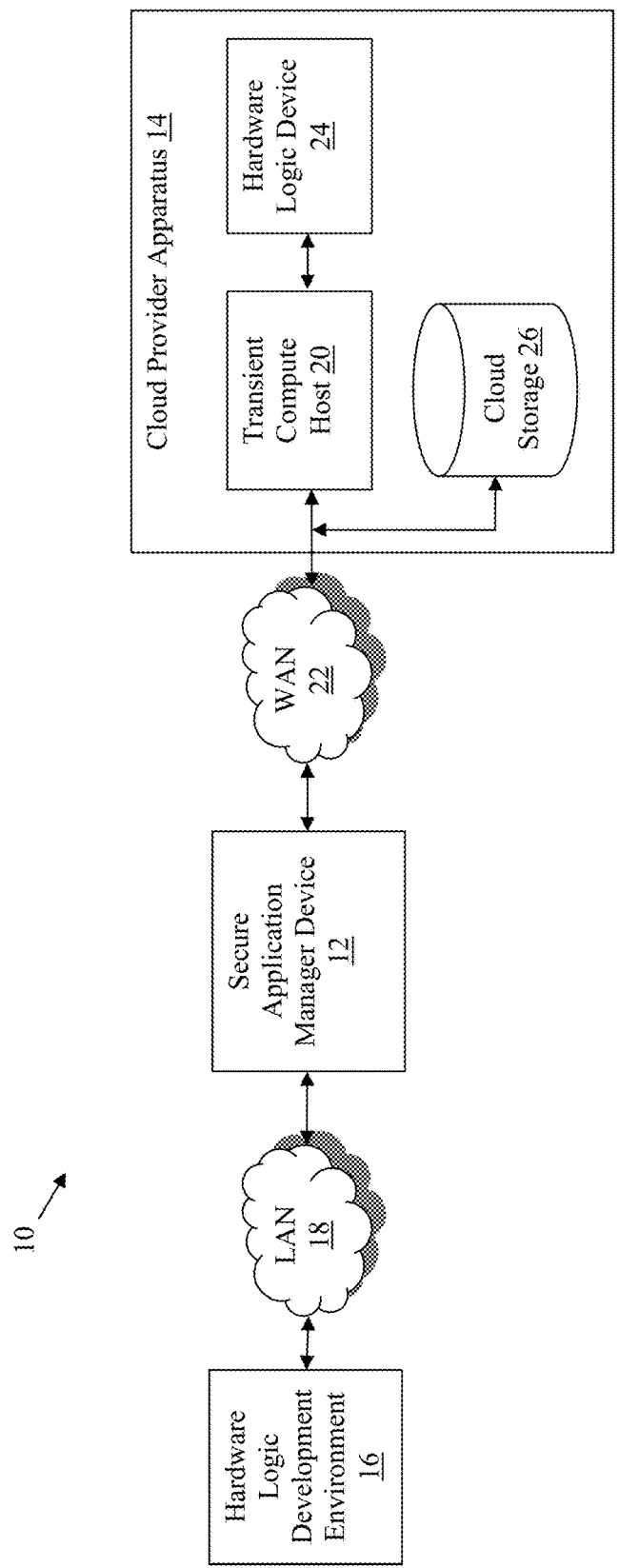
FIG. 1 is a block diagram of a network environment with an exemplary secure application manager device and cloud provider apparatus.

A cloud storage network environment 10 including an exemplary secure application manager device 12 and cloud provider apparatus 14 is illustrated in FIG. 1. The secure application manager device 12 in this example is coupled to a hardware logic development environment 16 by a local area network (LAN) 18 and a transient compute host 20 of the cloud provider apparatus 14 by a wide area network (WAN). Additionally, the cloud provider apparatus 14 includes a hardware logic device 24 and cloud storage 26 coupled to the transient compute host 20. This network environment 10 may include other network devices such as one or more routers and/or switches, for example, which are well known in the art and thus will not be described herein. This technology provides a number of advantages including methods, non-transitory computer readable media, and devices that facilitate secure cloud compute environments for applications to be executed on hardware logic devices hosted in associated cloud networks.

In this example, the secure application manager device 12 generates hardware description language (e.g. VHSIC Hardware Description Language or VHDL) code that is communicated to the hardware logic development environment 16 via the LAN 18. The hardware logic development environment 16 is configured to generate profiling and application bitstreams from the provided hardware description language code, which can be used to program the hardware logic device 24 to carry out certain tasks, as described and illustrated in more detail later. While the hardware logic device 24 is described and illustrated by way of the examples herein as a field programmable gate array (FPGA), the hardware logic device 24 can be another type of configurable or programmable hardware logic in other examples.

The hardware logic development environment 16 can include one or more standalone devices separate from the secure application manager device 12 and including one or more processors, a memory, and a communication interface coupled together by a bus or other communication link, although the hardware logic development environment 16 can have other types and numbers of components or other elements. In another example, the hardware logic development environment 16 can be included within the secure application manager device 12 (e.g., as a module within a memory of the secure application manager device 12), and other configurations can also be used.

The cloud storage 26 of the cloud provider apparatus 14 in this example can include any number and type of data storage devices (e.g., storage server(s)) capable of storing data. Accordingly, the cloud storage 26 can include hard disk drives, optical disk-based storage, flash memory, solid state drives (SSDs), or any other type of volatile or non-volatile memory. The cloud storage is utilized by the secure application manager device 12 to store a secure application package (SAP) that includes the application (and, optionally, associated data and/or key(s) providing access thereto) that is executed by the hardware logic device 24, as described and illustrated in more detail later.

Figure 2:
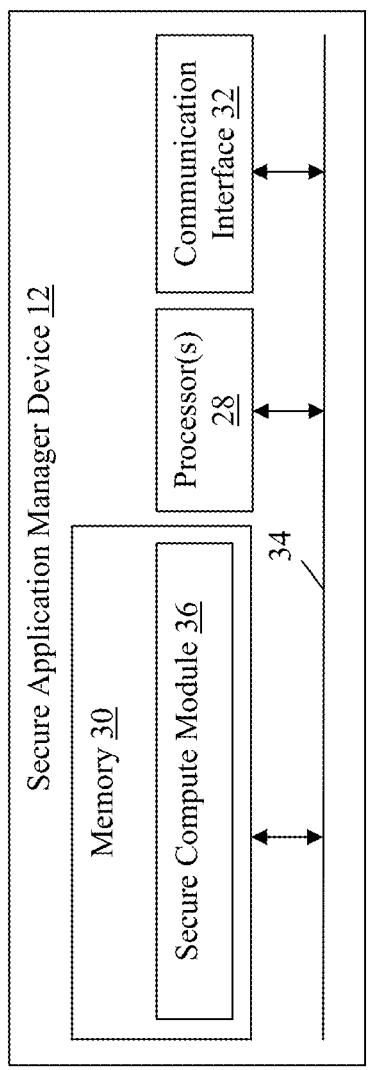
FIG. 2 is a block diagram of an exemplary secure application manager device.

Referring to FIG. 2, a block diagram of the secure application manager device 12 is illustrated. The secure application manager device 12 generally facilitates execution of applications on the hardware logic device 24 of the cloud provider apparatus 14. In this example, the secure application manager device 12 includes processor(s) 28, a memory 30, and a communication interface 32, which are coupled together by a bus 34 or other communication link.

The processor(s) 28 of the secure application manager device 12 may execute a program of stored instructions for one or more aspects of this technology, as described and illustrated by way of the embodiments herein, although the processor(s) 28 could execute other numbers and types of programmed instructions. The processor(s) 28 in the secure application manager device 12 may include one or more central processing units (CPUs) or general purpose processors with one or more processing cores, for example.

The memory 30 of the secure application manager device 12 may include any of various forms of read only memory (ROM), random access memory (RAM), flash memory, non-volatile or volatile memory, or the like, or a combination of such devices, for example. In this example, the memory 30 includes a secure compute module 36, although other types and/or numbers of applications or modules can also be included in other examples.

The secure compute module 36 in this example interfaces with the hardware logic development environment 16 to generate profiling and application bitstreams to be used by the cloud provider apparatus 14 to program the hardware logic device 24. The profiling bitstream is generally configured to analyze the integrity of the hardware logic device 24 and its ability to be used for secure execution of an application, as described and illustrated in more detail later. The application bitstream is generally configured to cause the hardware logic device 24 to retrieve an SAP, which was previously stored on the cloud storage 26 by the secure application manager device 12, and execute an application included therein, also as described and illustrated in more detail later.

Additionally, the secure compute module 36 is configured to interface with the cloud provider apparatus 14 to store the SAP with the application to be executed on the cloud storage 26 in this example. Additionally, the secure compute module 36 communicates with the transient compute host 20 of the cloud provider apparatus 14 to request that the transient computer host 20 carry out the programming of the hardware logic device 24 based on the provided bitstreams to facilitate retrieval and execution of the SAP on the hardware logic device 24, as described and illustrated in more detail later.

The communication interface 32 of the secure application manager device 12 operatively couples and communicates between the secure application manager device 12, the hardware logic development environment 16, and the cloud provider apparatus 14, which are coupled together by the LAN 18 and WAN 22, respectively, although other types and numbers of communication networks or systems with other types and numbers of connections and configurations to other devices and elements also can be used.

By way of example only, the LAN 18 and/or WAN 22 (e.g., the Internet) can use TCP/IP over Ethernet and industry-standard protocols, including HTTP/HTTPS, NFS, CIFS, SOAP, XML, LDAP, and SNMP, although other types and numbers of communication networks, can be used. The LAN 18 and/or WAN 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Figure 3:
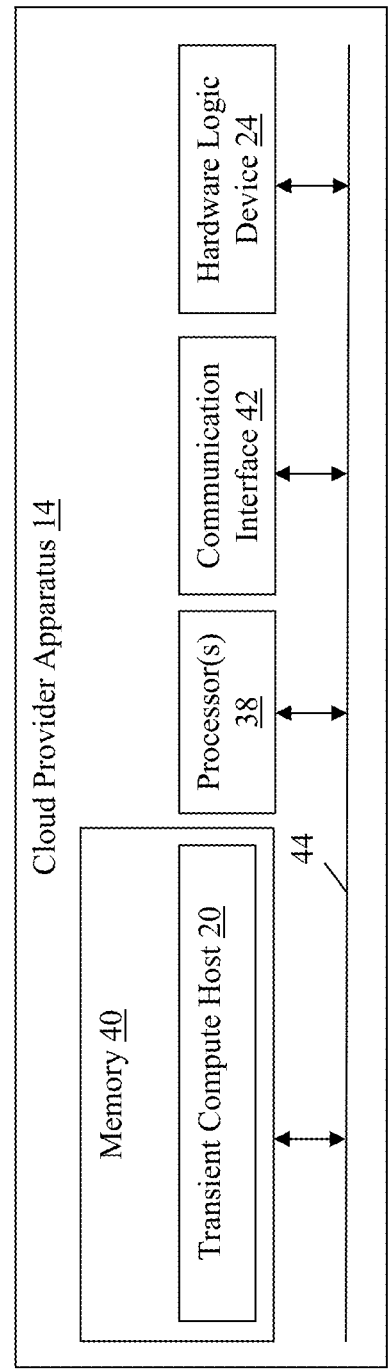
FIG. 3 is a block diagram of an exemplary cloud provider apparatus.

Referring to FIG. 3, a block diagram of the cloud provider apparatus 20 is illustrated. The cloud provider apparatus 14 generally interfaces with the secure application manager device 12 to obtain and store the SAP on the cloud storage 26 and receives and processes bitstreams used to program the hardware logic device 24. In this example, the cloud provider apparatus 14 includes processor(s) 38, a memory 40, a communication interface 42, and the hardware logic device 24, which are coupled together by a bus 44 (e.g., a PCIe bus) or other communication link.

The processor(s) 38 of the cloud provider apparatus 14 may execute a program of stored instructions for one or more aspects of this technology, as described and illustrated by way of the embodiments herein, although the processor(s) 38 could execute other numbers and types of programmed instructions. The processor(s) 38 in the cloud provider apparatus 14 may include one or more central processing units (CPUs) or general purpose processors with one or more processing cores, for example.

The memory 40 of the cloud provider apparatus 14 may include any of various forms of read only memory (ROM), random access memory (RAM), flash memory, non-volatile or volatile memory, or the like, or a combination of such devices, for example. In this example, the memory 40 includes the transient compute host 20, although other types and/or numbers of applications or modules can also be included in other examples.

The transient compute host 20 in this example can be a module or application, for example, which interfaces with the secure application manager device 12 and hardware logic device 24, and optionally the cloud storage 26. Accordingly, the transient compute host 20 is an intermediary that obtains bitstreams from the secure application manager device 12, programs the hardware logic device 24 based on the bitstreams, and handles results of execution of the bitstreams by the hardware logic device 24. While only one transient compute host 20 is illustrated in FIGS. 1 and 3, any number of transient compute hosts 20 can be executed by the cloud provider apparatus 14 in other examples.

The communication interface 42 of the cloud provider apparatus 14 can operatively couples and communicates between the cloud provider apparatus 14 and the secure application manager device 12, which are coupled together by the WAN 22, although other types and numbers of communication networks or systems with other types and numbers of connections and configurations to other devices and elements also can be used.

Although examples of the secure application manager device 12, cloud provider apparatus 14, and hardware logic development environment 16, are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 4:
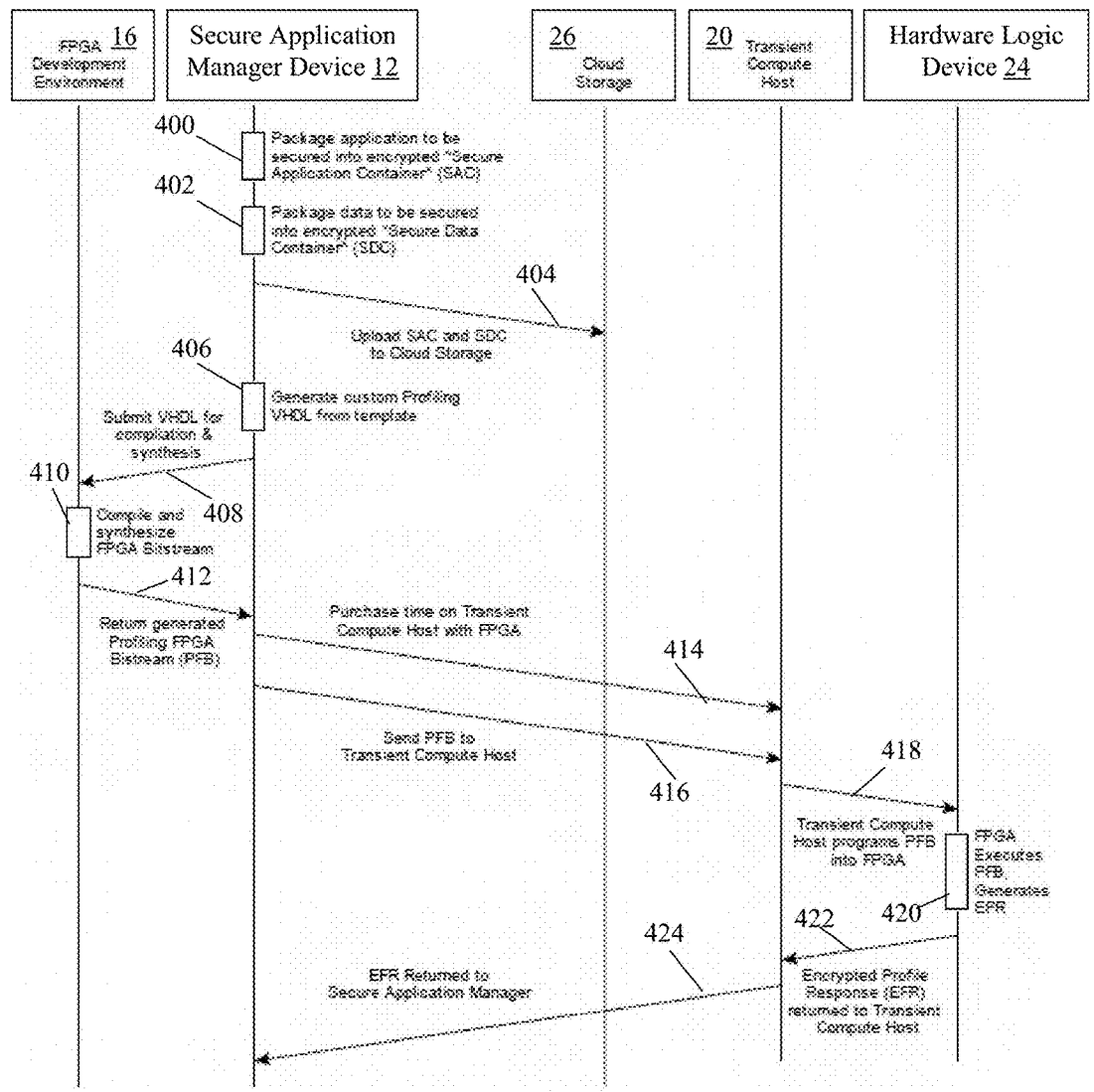
FIG. 4 is a timing diagram of an exemplary method for setting up a hardware logic device of a cloud provider apparatus to facilitate a secure cloud compute environment.

An exemplary method for facilitating secure cloud compute environments will now be described with reference to FIGS. 1-11. Referring more specifically to FIG. 4, a timing diagram of an exemplary method for setting up the hardware logic device 24 of the cloud provider apparatus 14 to facilitate a secure cloud compute environment is illustrated.

In step 400 in this example, the secure application manager device 12 packages an application to be secured into an SAP, referred to as a secure application container (SAC) in this example. In step 402, the secure application manager device 12 packages data to be secured into a secure data container (SDC). The secure application manager device 12 also encrypts one or more of the SAC or the SDC with an SAP encryption key. By way of example only, the application packaged in the SAC can be an application for distributed processing of large data sets (e.g., Hadoop) and the data can be medical records that include sensitive data (or key(s) that facilitate access to encrypted data such as medical records).

Figure 5:
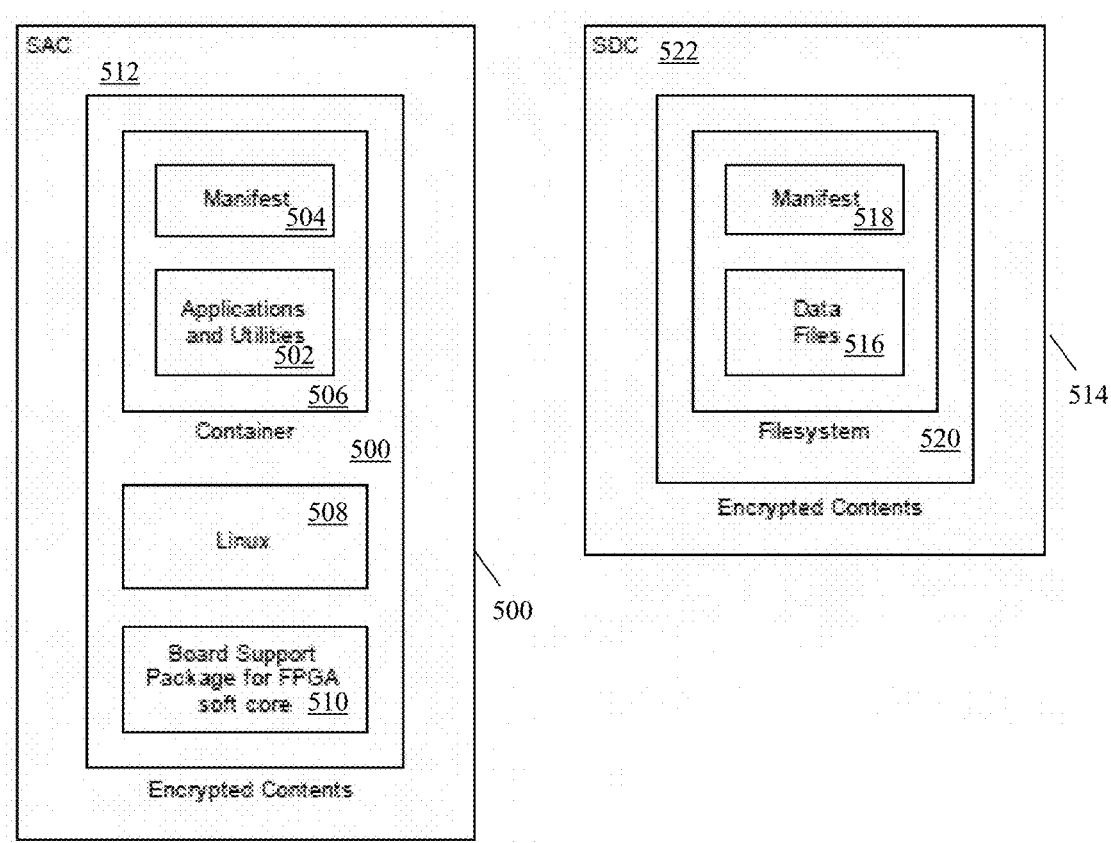
FIG. 5 is a block diagram of exemplary software packages utilized to facilitate a secure cloud compute environment.

Referring more specifically to FIG. 5, a block diagram of exemplary software packages utilized to facilitate a secure cloud compute environment is illustrated. In this particular example, the SAC 500 includes the application to be secured and utilities 502, an associated manifest 504 within a container 506, a Linux operating system 508, and a board support package for an FPGA softcore 510, which together comprise the encrypted contents 512. Other types of operating systems and other contents can also be included in the SAC in other examples.

Additionally, the SDC 514 in this example includes the data and/or files 516 to be used by the application 502, an associated manifest 518, and a filesystem 522, which together comprise the encrypted contents 522. While in this particular example, the secure application manager device 12 generates an SAC 500 and an SDC 514, the encrypted contents 522 of the SDC 514 could be included in the same SAP (e.g., the SAC 500), and other configurations and/or numbers or types of packages can also be used in other examples.

In step 404, the secure application manager device 12 uploads the SAP (e.g., the SAC 500) and, in this particular example, the SDC 514, to the cloud 26 of the cloud provider apparatus 14. Accordingly, the application to be secured, as well as associated data in this example, are encrypted with an SAP encryption key, communicated in an encrypted form via the WAN 22, and stored in the encrypted form by the secure application manager device 12 on the cloud storage 26.

In step 406, the secure application manager device 12 generates custom profiling hardware description language (also referred to herein as VHDL) code (also referred to herein as profiling VHDL), optionally from a template.

In step 408, the secure application manager device 12 submits the profiling VHDL for compilation and synthesis to the hardware logic development environment 16 (also referred to herein as the FPGA development environment).

In step 410, the hardware logic development environment 16 compiles and synthesizes a profiling bitstream (also referred to herein as an FPGA bitstream or profiling FPGA bitstream (PFB)) using the profiling hardware description language code. The profiling bitstream in this example includes a client public key associated with the secure application manager device 12 and for which the secure application manager device 12 stores a corresponding private key. The profiling bitstream is configured to, when implemented by the hardware logic device 24, cause the hardware logic device 24 to generate and return a profile response encrypted with the client public key. The profile response includes a bitstream encryption key (also referred to herein as an FPGA key), along with other information (e.g., integrity check result(s)), as described and illustrated in more detail later.

In step 414, the secure application manager device 12 optionally communicates with the transient compute host 20 of the cloud provider apparatus 14 to purchase time with the hardware logic device 24.

In step 416, the secure application manager device 12 sends the profiling bitstream to the transient compute host 20.

In step 418, the transient compute host 20 of the cloud provider apparatus 14 programs the profiling bitstream into the hardware logic device 24. In step 420, the hardware logic device 24 executes the profiling bitstream and generates a profile response (also referred to herein as an encrypted profile response (EFR)). Accordingly, the hardware logic device 24, based on the execution of the profile bitstream, generates a profile response that includes a generated bitstream encryption key that is securely configured into the hardware logic device 24, and results of integrity check(s), for example.

The bitstream encryption key is used by the secure application manager device 12 to encrypt an application FPGA bitstream that is used to transmit the SAP encryption key and softcore, which is used by the hardware logic device 24 to decrypt and execute the SAP, as described and illustrated in more detail later. The hardware logic device 24 encrypts the profile response with the client public key so that only the secure application manager device 12 with the client private key can decrypt the profile response and access the bitstream encryption key, along with other information contained therein.

In step 422, the hardware logic device 24 returns the profile response, encrypted with the client public key, to the transient compute host 20. In step 424, the transient compute host 20 sends the encrypted profile response to the secure application manager device 12.

Figure 6:
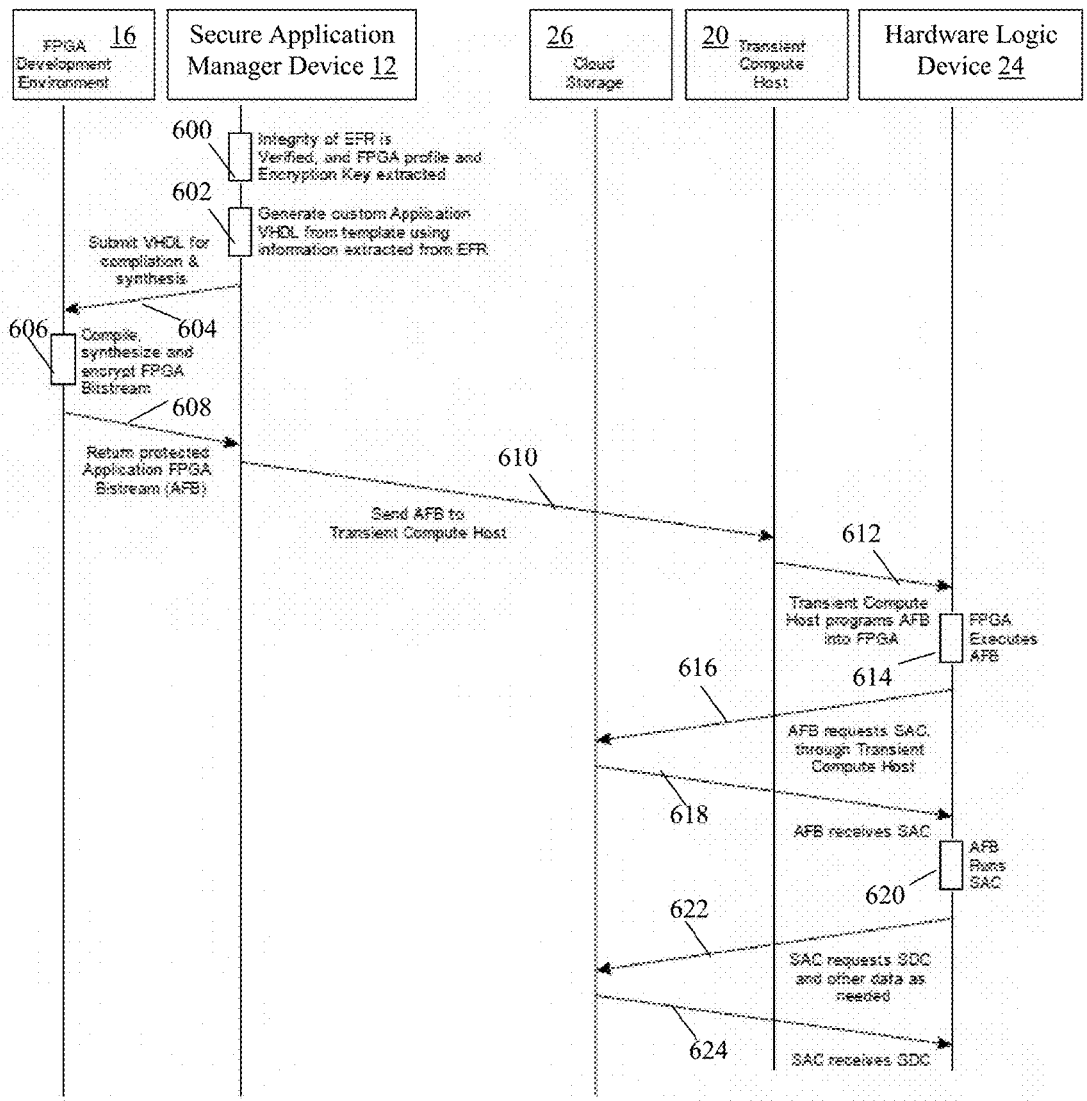
FIG. 6 is a timing diagram of an exemplary method for executing an application on a hardware logic device of a cloud provider apparatus and in a secure cloud compute environment.

Referring more specifically to FIG. 6, a timing diagram of an exemplary method for executing an application on the hardware logic device 24 of the cloud provider apparatus 14, and in a secure cloud compute environment, is illustrated. In step 600 in this example, the secure application manager device 12 decrypts a received profile response using a stored client private key and verifies the integrity of the hardware logic device 24 based on integrity check results and other information included in the profile response. The profile response could have been sent by the transient compute host 20, as described and illustrated earlier with reference to step 424 of FIG. 4, for example. The secure application manager device 12 further extracts the bitstream encryption key from the decrypted profile response.

In step 602, the secure application manager device 12 generates custom application hardware description language code (also referred to herein as application VHDL), optionally from a template, using information extracted from the decrypted profile response. In step 604, the secure application manager device 12 submits the application hardware description language code for compilation and synthesis to the hardware logic development environment 16. In another example, the SAP can be included in the application bitstream, optionally separately encrypted, instead of being previously stored on the cloud storage 26 of the cloud provider apparatus 14.

In step 606, the hardware logic development environment 16 compiles and synthesizes an application bitstream (also referred to herein as an FPGA bitstream or application FPGA bitstream (AFB)) using the application hardware description language code. The application bitstream in this example includes the SAP encryption key that was previously used to encrypt the SAP stored on the cloud storage 26, as described and illustrated earlier with reference to steps 400-404 of FIG. 4. Generally, the application bitstream is configured to, when executed by the hardware logic device 24, cause the hardware logic device 24 to obtain the SAP from the cloud storage 26, decrypt the SAP using the SAP encryption key, and execute the application included in the SAP on the softcore included in the AFB.

In step 608, the hardware logic development environment 16 returns the application bitstream to the secure application manager device 12. In this example, the hardware logic development environment 16 encrypts the application bitstream using the bitstream encryption key extracted by the secure application manager device 12 in step 600.

In step 610, the secure application manager device 12 sends the application bitstream, encrypted with the bitstream encryption key, to the transient compute host 20 of the cloud provider apparatus 14 via the WAN 22.

In step 612, the transient compute host 20 of the cloud provider apparatus 14 programs the application bitstream into the hardware logic device 24. In step 614, the hardware logic device 24 decrypts the application bitstream using the bitstream encryption key. The hardware logic device 24 included the bitstream encryption key with the profile response sent to the secure application manager device 12, as described and illustrated earlier with reference to steps 420-424 of FIG. 4. Additionally, the secure application manager device 12 decrypted the profile response to obtain the bitstream encryption key, as described and illustrated earlier with reference to step 600 of FIG. 6. By decrypting the application bitstream, the hardware logic device 24 accesses the SAP encryption key included therein by the secure application manager device 12.

In step 616, based on an execution of the application bitstream, the hardware logic device 24 requests the SAP (the SAC 500 in this example) from the cloud storage 26 and via the transient compute host 20. The SAC 500 could have been previously stored on the cloud storage 26 as described and illustrated earlier with reference to step 404 of FIG. 4, for example.

In step 618, the cloud storage 26, via the transient compute host 20, returns the requested SAC 500. In step 620, the hardware logic device 24 decrypts the encrypted contents 512 of the SAC 500 using the SAP encryption key included with the application bitstream that the hardware logic device 24 previously decrypted using the bitstream encryption key. The hardware logic device 24 then executes one or more of the encrypted contents 512. In particular, the hardware logic device 24 can execute the application 506 within the Linux operating system 508, with support packages 510 allowing it to run on the softcore, for example.

In step 622, the hardware logic device 24, based on an execution of the application 506, requests the SDC 514, in this example, from the cloud storage 26 and via the transient compute host 20. The SDC 514 could have been previously stored on the cloud storage 26 as described and illustrated earlier with reference to step 404 of FIG. 4, for example. In step 624, the cloud storage 26, via the transient compute host 20, returns the requested SDC 514, and the hardware logic device 24 optionally accesses the encrypted contents 522 using the same or a different SAP encryption key as was previously used to decrypt the SAC 500. Thereby, the hardware logic device 24 can execute the application 502 using the data 516 in a relatively secure manner, while advantageously maintaining a chain of trust.

Figure 7:
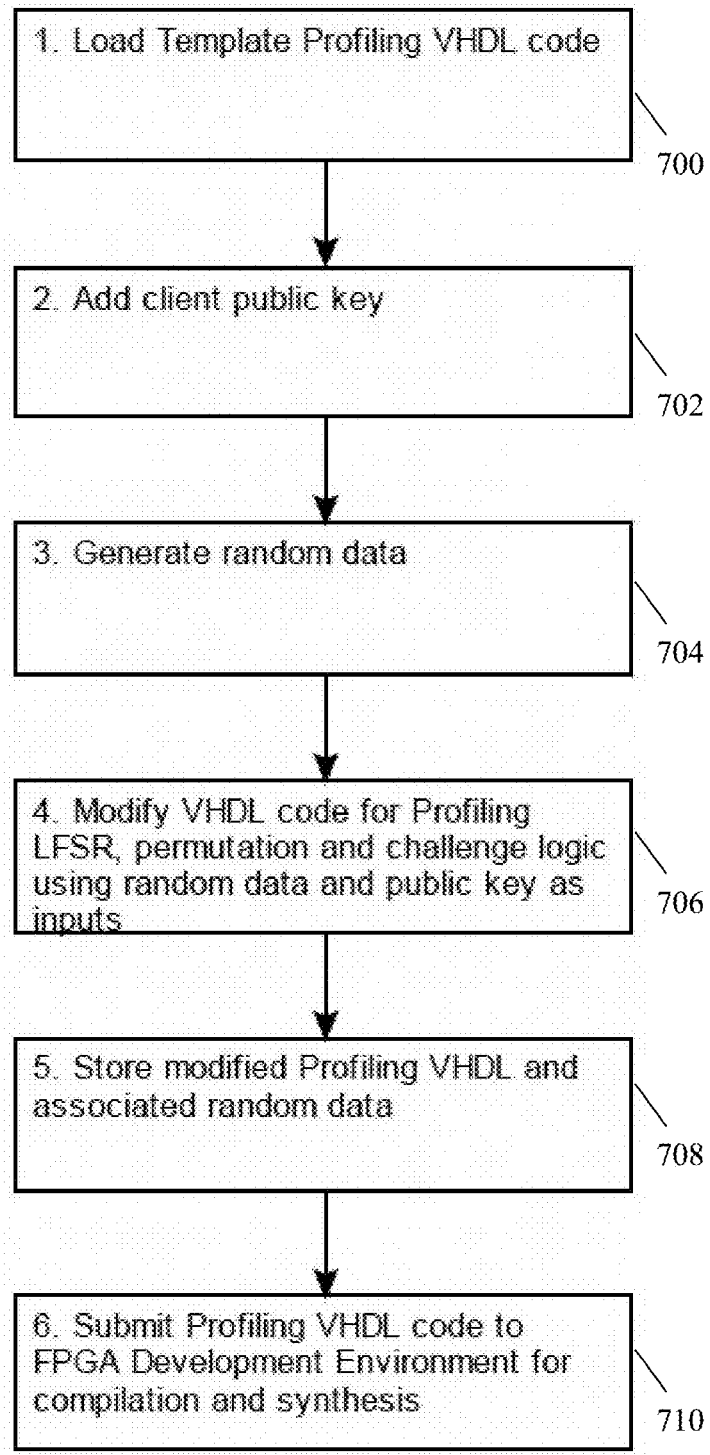
FIG. 7 is a flowchart of an exemplary method for generating a profiling bitstream by a secure application manager device.

Referring more specifically to FIG. 7, a flowchart of an exemplary method for generating a profiling bitstream by the secure application manager device 12 is illustrated. In step 700 in this example, the secure application manager device 12 loads a template profiling hardware description language (e.g., VHDL) code. The template profiling hardware description language code, when converted to a profiling bitstream and executed by the hardware logic device 24, causes the hardware logic device 24 to generate and return a profile response, which includes a bitstream encryption key, along with other information (e.g., integrity check result(s)), In step 702, the secure application manager device 12 adds a client public key to the profiling hardware description language code. The secure application manager device 12 stores the corresponding client private key in this example. In step 704, the secure application manager device 12 generates random data. The random data is used to add complexity to the profiling hardware description language code and protect against attacks. Additionally, in step 706, the secure application manager device 12 modifies the profiling hardware description language code (e.g., integrity checks such as challenge logic included therein) using the random data and public key as inputs.

By modifying the profiling hardware description language code based on the random data, the profiling bitstream resulting from the profiling hardware description language code will be a per-execution profiling bitstream (e.g., it will be different for every iteration) that will advantageously protect against pre-computation reverse engineering and alteration attacks. Accordingly, the complexity of the hardware description language code increases the time required to reverse engineer or alter the resulting profile bit stream, thereby increasing security.

In step 708, the secure application manager device 12 optionally stores the profiling hardware description language code and associated random data, generated in step 704, in the memory 30.

In step 710, the secure application manager device 12 submits the profiling hardware description language code to the hardware logic development environment 16 for compilation and synthesis. The hardware logic development environment 16 subsequently generates the profiling bitstream, returns the profile bitstream to the secure application manager device 12, and the secure application manager device 12 sends the profiling bitstream to the transient compute host 20 of the cloud provider apparatus 14, as described and illustrated in more detail earlier.

Figure 8:
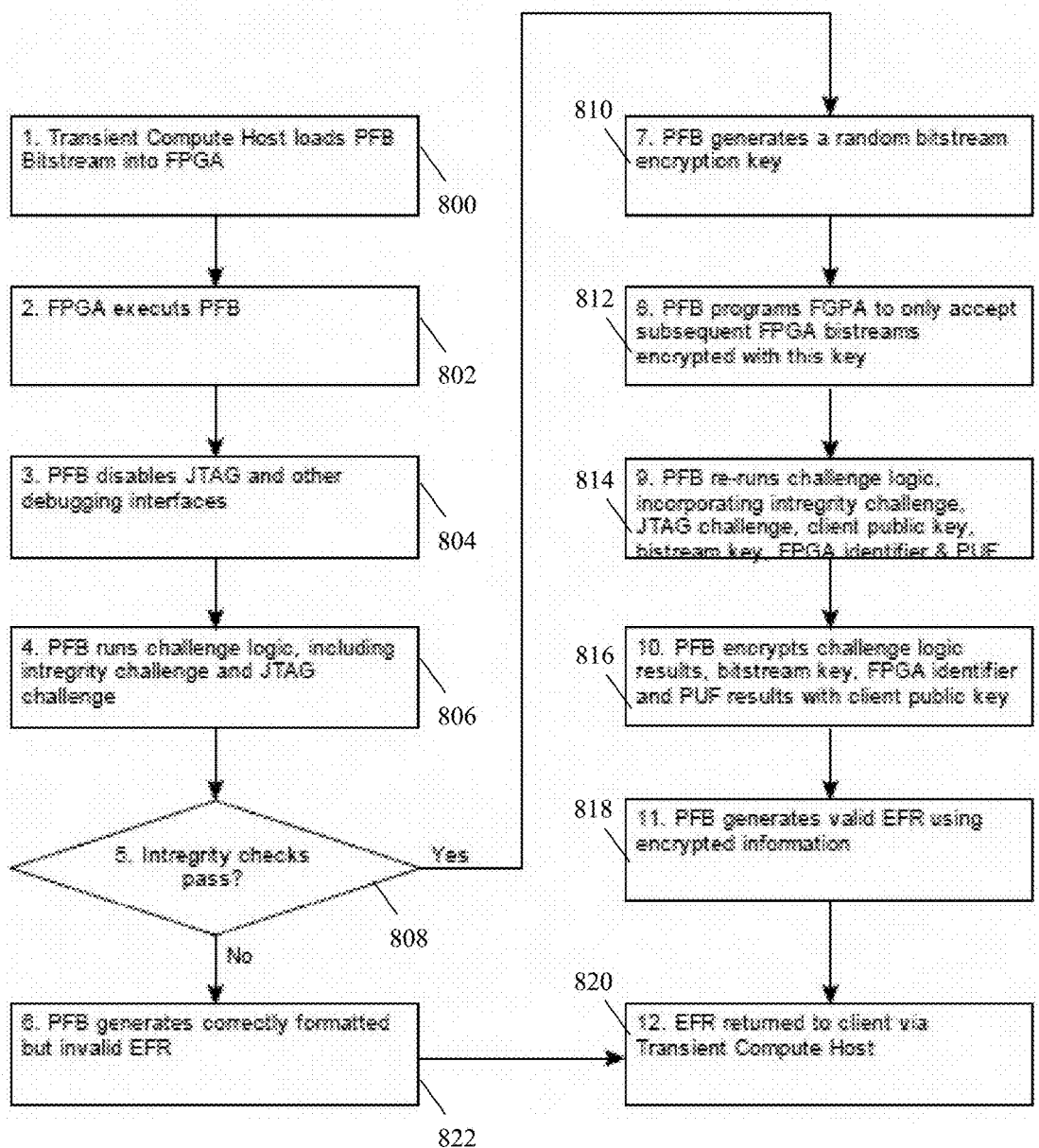
FIG. 8 is a flowchart of an exemplary method for executing a profiling bitstream by a cloud provider apparatus.

Referring more specifically to FIG. 8, a flowchart of an exemplary method for executing the profiling bitstream by the cloud provider apparatus 14 is illustrated. In step 800 in this example, the transient compute host 20 of the cloud provider apparatus 14 loads the profiling bitstream into the hardware logic device 24 of the cloud provider apparatus 14. Additionally, in step 802, the hardware logic device 24 executes the profiling bitstream.

In step 804, hardware logic device 24 of the cloud provider apparatus 14, based on execution of the profiling bitstream, optionally disables Joint Test Action Group (JTAG) and/or other debugging interface(s). By disabling such interfaces, the hardware logic device 24 increases the difficulty of runtime program and state modification and extraction.

In step 806, the hardware logic device 24 of the cloud provider apparatus 14, based on execution of the profiling bitstream, runs challenge logic, including one or more integrity challenges and/or JTAG challenges. In one example, the challenge logic is capable of detecting whether the profiling bitstream has been altered, whether any other logic has been added to the profiling bitstream, and whether the hardware logic device 24 is emulated or otherwise not as expected, although other types of challenges can also be used in other examples. In some examples, the challenge logic runs at a relatively high speed, but is relatively slow to emulate, thereby facilitating detection of attacks in which the hardware logic device 24 is simulated. Optionally, the hardware logic device 24 generates result(s) based on execution of the challenges.

In step 808, the hardware logic device 24 of the cloud provider apparatus 14, based on execution of the profiling bitstream, determines whether the integrity check(s) passed, such as based on an analysis of the generated result(s), for example. If the hardware logic device 24 determines that the integrity check(s) have passed, then the Yes branch is taken to step 810.

In step 810, the hardware logic device 24 of the cloud provider apparatus 14, based on execution of the profiling bitstream, generates a random bitstream encryption key and, in step 812, is programmed to accept only bitstream(s) (e.g., the application bitstream) that is encrypted with the bitstream encryption key. This technology advantageously enables a chain of trust that facilitates secure application execution even though the bitstream encryption key is generated in an untrusted environment (e.g., at the cloud provider apparatus).

In step 814, the hardware logic device 24 of the cloud provider apparatus 14, based on execution of the profiling bitstream, re-runs the challenge logic, which was previously run in step 806, in order to regenerate the results for inclusion in a profile response. The hardware logic device 24 optionally further executes a physically unclonable function (PUF), which generates a different result for each hardware logic device on which it is run. Accordingly, the PUF result is unique to the hardware logic device 24.

In step 816, the hardware logic device 24 of the cloud provider apparatus 14, based on execution of the profiling bitstream, encrypts, using the client public key, the challenge logic results generated in step 814, bitstream encryption key generated in step 810, an identifier of the hardware logic device 24, and the PUF result generated in step 814. By encrypting this data with the client public key, the hardware logic device 24 advantageously prevents the cloud provider, which may be untrusted, from modifying or accessing the data, including, in particular, the bitstream encryption key.

In step 818, the hardware logic device 24 of the cloud provider apparatus 14, based on execution of the profiling bitstream, generates a valid profile response using the information encrypted in step 810. In step 820, the hardware logic device 24 of the cloud provider apparatus 14, based on execution of the profiling bitstream, returns the profile response to the secure application manager device 12 via the transient compute host 20.

Referring back to step 808, if the hardware logic device 24 of the cloud provider apparatus 14, based on execution of the profiling bitstream, determines that one or more of the integrity check(s), executed as part of the challenge logic in step 806, do not pass, then the No branch is taken to step 822. in step 822, the hardware logic device 24 of the cloud provider apparatus 14, based on execution of the profiling bitstream, generates a correctly formatted, but invalid profile response, and returns the profile response to the secure application manager device 12 via the transient compute host 20 in step 820.

Figure 9:
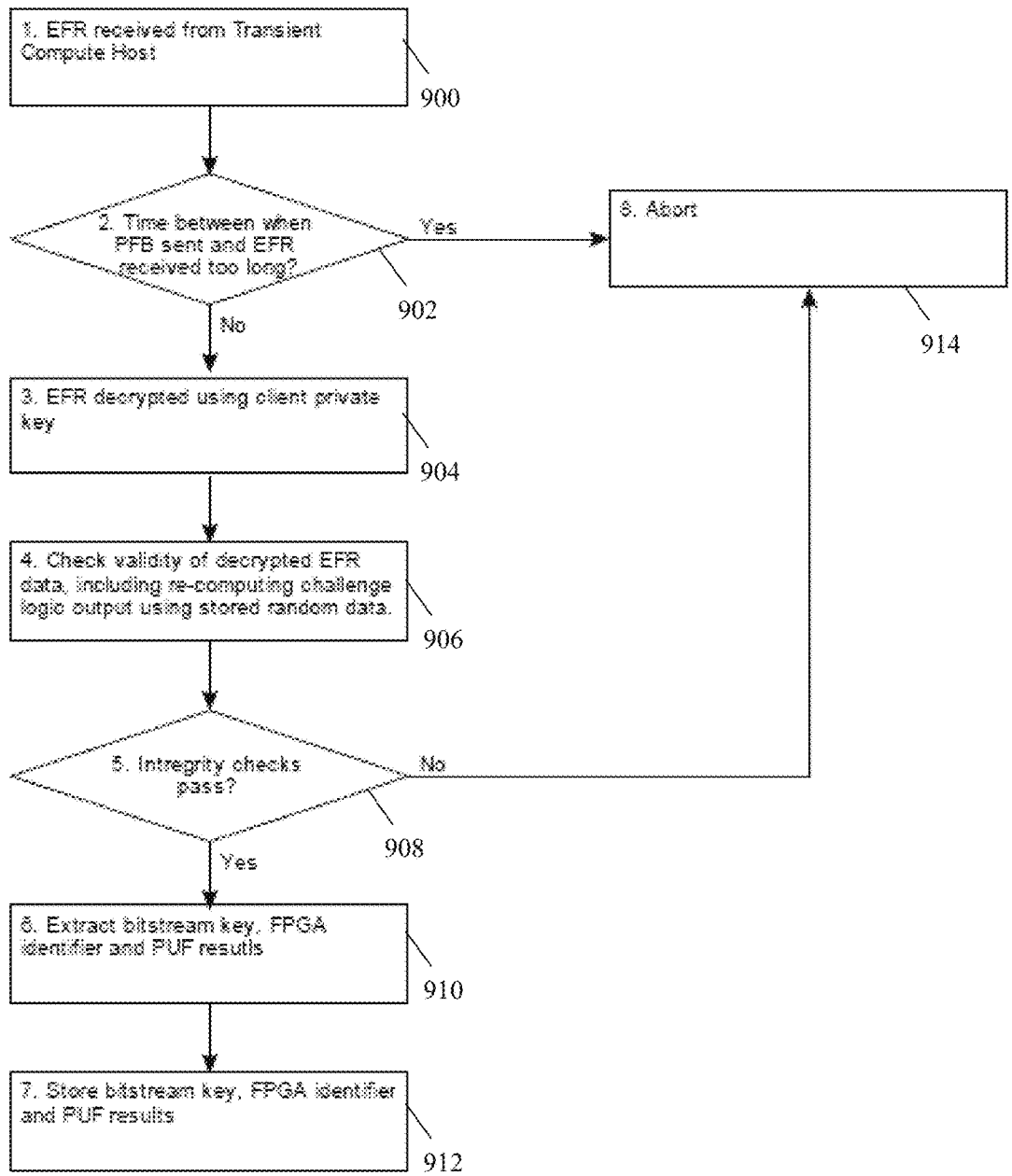
FIG. 9 is a flowchart of an exemplary method for evaluating a profile response by a secure application manager device.

Referring more specifically to FIG. 9, a flowchart of an exemplary method for evaluating a profile response by the secure application manager device 12 is illustrated. In step 900 in this example, the secure application manager device 12 receives a profile response from the transient compute host 20 of the cloud provider apparatus 14. The profile response could have been sent as described and illustrated in more detail earlier with reference to step 820 of FIG. 8, for example.

In step 902, the secure application manager device 12 optionally determines whether a time between when a profiling bitstream was sent to the cloud provider apparatus 14, such as described and illustrated earlier with reference to step 416 of FIG. 4, for example, and when the profile response was received in step 900 exceeds a threshold, which may indicate whether there has been a security breach or attack. Accordingly, the secure application manager device 12 can optionally store (e.g., in the memory 30) the time at which the profiling bitstream is sent to the cloud provider apparatus 14 in order to analyze the condition in step 902. If the secure application manager device 12 determines in step 902 that the threshold has not been exceeded, then the No branch is taken to step 904.

In step 904, the secure application manager device 12 decrypts the profile response using a client private key. The profile response could have been encrypted by the hardware logic device 24 using a client public key as described and illustrated earlier with reference to steps 816-818 of FIG. 8, for example.

In step 906, the secure application manager device 12 analyzes the validity of the decrypted profile response. In one example, the secure application manager device 12 can recompute the challenge logic output using random data, which could have been used to generate the challenge logic, and/or could have been stored, as described and illustrated in more detail earlier in steps 706 and 708, respectively, for example. Since the random data is only known to the secure application manager device 12, an attacker is less likely to be able to spoof or imitate the challenge logic and associated result(s).

In step 908, the secure application manager device 12 determines whether one or more of the integrity check(s) pass, indicating that no additional logic has been added to the profiling bitstream and that the hardware logic device 24 is not emulated and is otherwise as expected, for example. Accordingly, if the secure application manager device 12 determines that the integrity check(s) pass, then the Yes branch is taken to step 910.

In step 910, the secure application manager device 12 extracts the bitstream encryption key, hardware logic device identifier, and PUF result from the decrypted profile response and, in step 912, optionally stores the bitstream encryption key, hardware logic identifier and PUF result, such as in the memory 30, for example. However, if the secure application manager device 12 determines in step 902 that the threshold has not been exceeded or, in step 908, that the integrity check(s) did not pass, then the respective No branch is taken to step 914 in which the secure application manager device 12 aborts the attempt to establish a secure compute environment.

Figure 10:
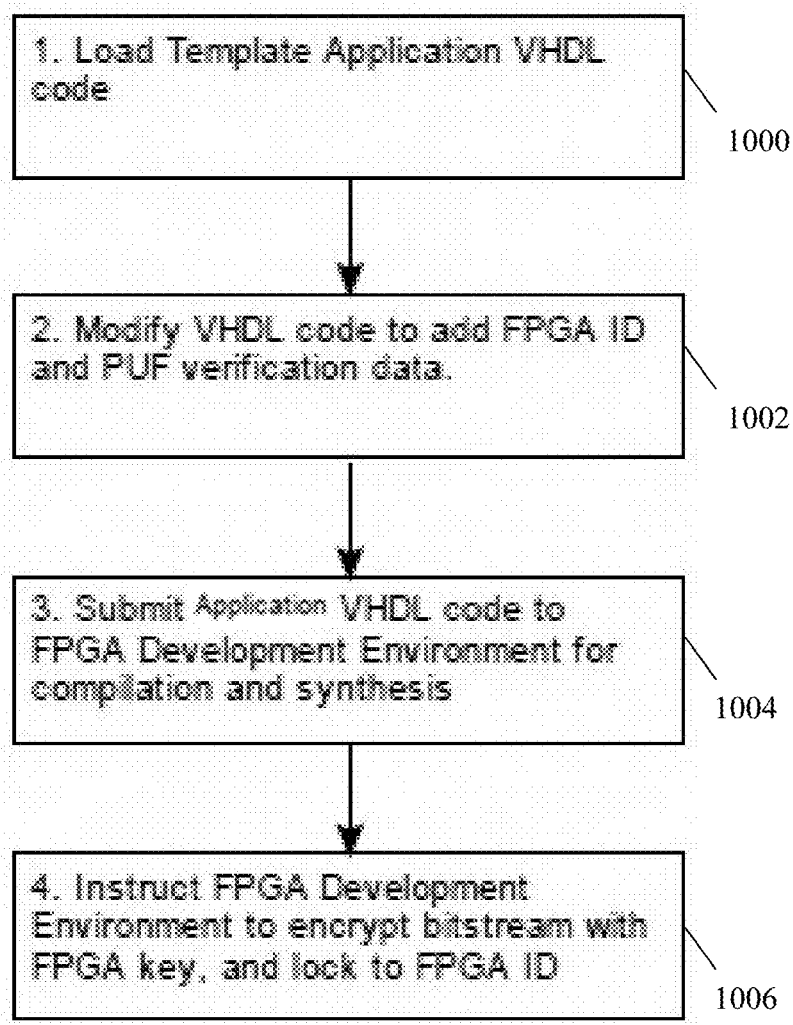
FIG. 10 is a flowchart of an exemplary method for generating an application bitstream by a secure application manager device.

Referring more specifically to FIG. 10, a flowchart of an exemplary method for generating an application bitstream by the secure application manager device 12 is illustrated. In step 1000 in this example, the secure application manager device 12 optionally loads a template application hardware description language code, which facilitates generation of an application bitstream.

In step 1002, the secure application manager device 12 modifies the application hardware description language code to add a hardware logic device identifier for the hardware logic device 24 and PUF verification data or result. The hardware logic device identifier and PUF result could have been previously stored in the memory 30, as described and illustrated earlier with reference to step 912 of FIG. 9, for example. Additionally, the secure application manager device 12 modifies the application hardware description language code such that the application bitstream generated therefrom includes the SAP encryption key used to encrypt the SAP that was previously stored on the cloud storage 26, as described and illustrated in more detail earlier with reference to steps 400-404 of FIG. 4, for example.

In step 1004, the secure application manager device 12 submits the application hardware description language code to the hardware logic development environment 16 for complication and synthesis into an application bitstream and, in step 1006 instructs the hardware logic development environment 16 to encrypt the application bitstream with the bitstream encryption key. Optionally, the secure application manager device 12 further instructs the hardware logic development environment 16 to lock the application bitstream to the hardware logic identifier such that only the hardware logic device 24 can execute the application bitstream. The secure application manager device 12 in this example then receives the encrypted, locked application bitstream from the hardware logic development environment 16 and sends the application bitstream to the transient compute host 20 of the cloud provider apparatus 14.

Figure 11:
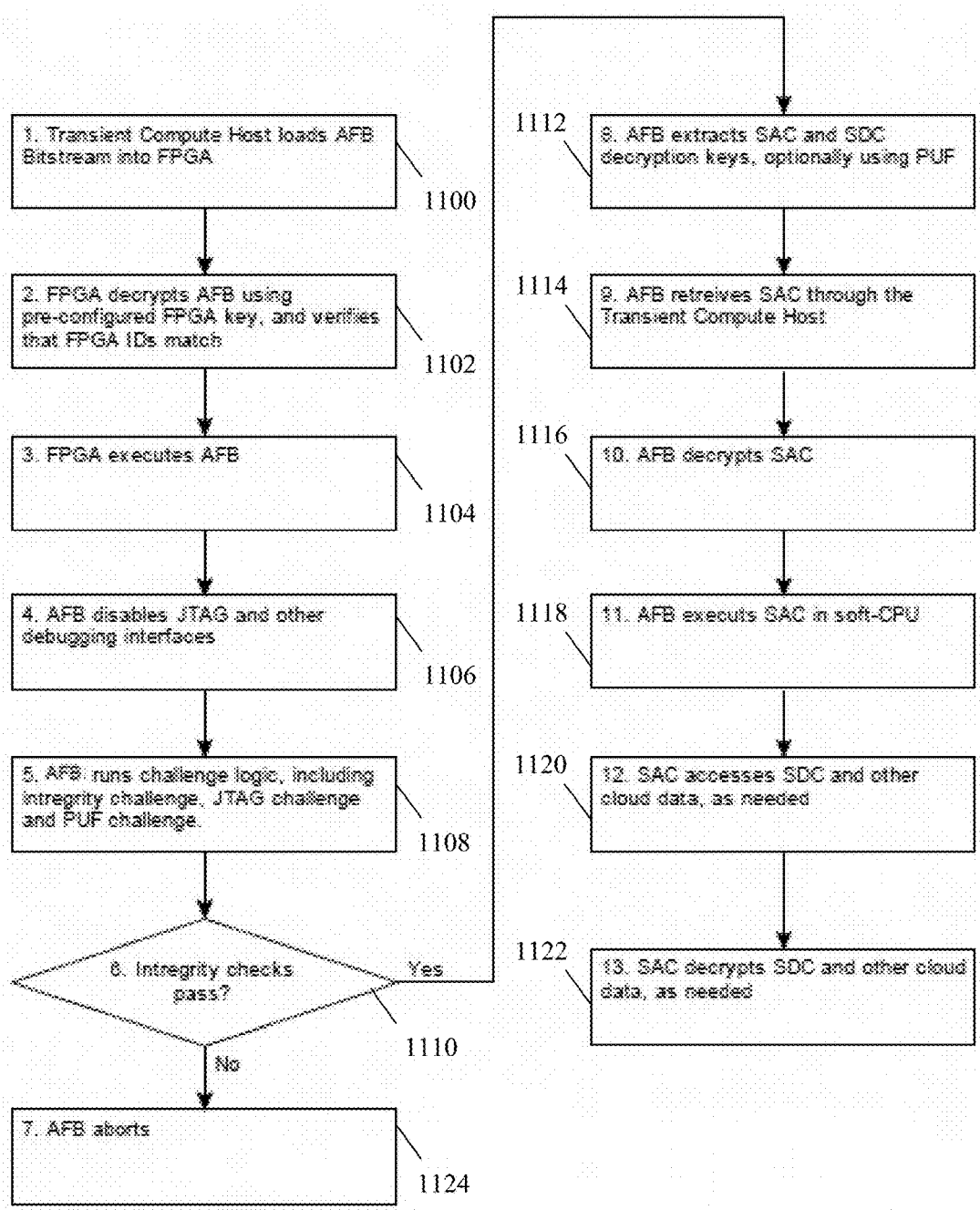
FIG. 11 is a flowchart of an exemplary method for executing the application bitstream by a hardware logic device of a cloud provider apparatus to establish a secure compute environment.

Referring more specifically to FIG. 11, a flowchart of an exemplary method for executing an application bitstream by the hardware logic device 24 of the cloud provider apparatus 14 to establish a secure compute environment is illustrated. In step 1100 in this example, the transient compute host 20 of the cloud provider apparatus 14 receives an application bitstream and loads the application bitstream into the hardware logic device 24. The application bitstream can be received by the transient compute host 20 from the secure application manager device 12, as described and illustrated earlier with reference to step 610, for example.

In step 1102, the hardware logic device 24 of the cloud provider apparatus 14, decrypts the application bitstream using the pre-configured and previously generated and stored bitstream encryption key. The hardware logic device 24 could have generated the bitstream encryption key as described and illustrated earlier with reference to step 810 of FIG. 8, for example. Encrypting the application bitstream with the bitstream encryption key advantageously prevents disclosure of the SAP encryption key contained within the application bitstream. Optionally, the hardware logic device 24 further verifies that the hardware logic device identifier included in the application bitstream matches a stored hardware logic identifier corresponding to the hardware logic device 24.

In step 1104, the hardware logic device 24 of the cloud provider apparatus 14 executes the application bitstream and, in step 1106, disables JTAG and other debugging interfaces based on execution of the application bitstream. Additionally, in step 1108, the hardware logic device 24 of the cloud provider apparatus 14, based on execution of the application bitstream, runs challenge logic including one or more integrity, JTAG, and/or PUF challenges, and generates one or more result(s).

In step 1110, the hardware logic device 24 of the cloud provider apparatus 14, based on execution of the application bitstream, determines whether one or more integrity check(s) pass based on the result(s) generates in step 1108. If the hardware logic device 24 determines that the integrity check(s) pass, then the Yes branch is taken to step 1112.

In step 1112, the hardware logic device 24 of the cloud provider apparatus 14, based on execution of the application bitstream, extracts at least one SAP encryption key. In this particular example, the secure application manager 12 previously stored an SAC and an SDC, each as encrypted with a respective encryption key, on the cloud storage 26. However, only one SAP and associated SAP encryption key can be used in other examples, and other numbers of encryption keys can also be used. Optionally, a PUF can be used to protect the SAP encryption key by making the SAP encryption key recoverable only on the hardware logic device 24.

In step 1114, the hardware logic device 24 of the cloud provider apparatus 14, based on execution of the application bitstream, retrieves the SAC in this example via the transient compute host 20. The SAC could have been previously stored on the cloud storage 26 by the secure application manager device 12, for example.

In step 1116, the hardware logic device 24 of the cloud provider apparatus 14, based on execution of the application bitstream, decrypts the SAC using the SAC encryption key extracted from the application bitstream in step 112. In step 1118, the hardware logic device 24 of the cloud provider apparatus 14, based on execution of the application bitstream, executes the SAC. In particular, the hardware logic device 24 in this example executes the application 502 in the Linux operating system 508 on the softcore included in the application bitstream, although the application 502 can be executed in other ways in other examples.

In step 1120, the hardware logic device 24 of the cloud provider apparatus 14, based on execution of the application bitstream, retrieves or otherwise accesses the SDC and other cloud data, as needed based on execution of the application 502. In order to access data 516, the hardware logic device 24 of the cloud provider apparatus 14, based on execution of the application bitstream, can communicate, in step 1122, via the transient compute host 20 to retrieve the SDC previously stored on the cloud storage 26 by the secure application manager device 12, for example. The hardware logic device 24 can then decrypt the SDC using the SDC encryption key extracted from the application bitstream in step 1112.

Referring back to step 1110, if the hardware logic device 24 of the cloud provider apparatus 14, based on execution of the application bitstream, determines that one or more of the integrity check(s) did not pass, then the No branch is taken to step 1124. In step 1124, the hardware logic device 24 of the cloud provider apparatus 14 aborts the process of establishing a secure compute environment on behalf of the secure application manager device 12.

With this technology, applications can be executed securely on hardware logic devices located in cloud provider environments. Advantageously, this technology facilitates plug-and-play secure computing environments that protect against a malicious or compromised cloud provider or other third party. Accordingly, this technology facilitates increased adoption and utilization of hardware logic devices in cloud environments, resulting in more efficient and secure execution of applications and other workloads.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   decrypting, by a first computing device, a profile response to extract a bitstream encryption key, wherein the profile response is received from a second computing device in response to a profiling bitstream sent to the second computing device; and
   sending, by the first computing device and to the second computing device, an application bitstream that is encrypted with the bitstream encryption key and includes a secure application package encryption key used to encrypt a secure application package stored at the second computing device.

2. The method of claim 1, wherein the secure application package comprises an application, data to be used by the application, and an operating system.

3. The method of claim 1, further comprising storing, by the first computing device, random data, wherein the profiling bitstream further includes challenge logic generated using the random data.

4. The method of claim 3, further comprising sending, by the first computing device, the application bitstream to the second computing device when integrity check is passed, wherein the integrity check is based on a comparison of a result of an execution of the challenge logic included in the profile response to another result generated from another execution of the challenge logic using the stored random data.

5. The method of claim 1, further comprising locking, by the first computing device, the application bitstream based on a hardware logic identifier included in the profile response.

6. The method of claim 1, wherein the profiling bitstream is configured to program a hardware logic device to only accept a subsequent bitstream encrypted with the bitstream encryption key.

7. A non-transitory machine readable medium having stored thereon instructions for facilitating secure cloud compute environments comprising machine executable code which when executed by a first machine causes the first machine to:
   decrypt a profile response to extract a bitstream encryption key, wherein the profile response is received from a second machine in response to a profiling bitstream sent to the second machine; and
   sending, to the second machine, an application bitstream that is encrypted with the bitstream encryption key and includes a secure application package encryption key used to encrypt a secure application package stored at the second machine.

8. The non-transitory machine readable medium of claim 7, wherein the secure application package comprises an application, data to be used by the application, and an operating system.

9. The non-transitory machine readable medium of claim 7, wherein the machine executable code when executed by the first machine further causes the first machine to store random data, wherein the profiling bitstream further includes challenge logic generated using the random data.

10. The non-transitory machine readable medium of claim 9, wherein the machine executable code when executed by the first machine further causes the first machine to send the application bitstream to the second machine when integrity check is passed, wherein the integrity check is based on a comparison of a result of an execution of the challenge logic included in the profile response to another result generated from another execution of the challenge logic using the stored random data.

11. The non-transitory machine readable medium of claim 7, wherein the machine executable code when executed by the first machine further causes the first machine to lock the application bitstream based on a hardware logic identifier included in the profile response.

12. The non-transitory machine readable medium of claim 7, wherein the profiling bitstream is configured to program a hardware logic device to only accept a subsequent bitstream encrypted with the bitstream encryption key.

13. A first computing device, comprising:
   a memory containing machine readable medium comprising machine executable code having stored thereon instructions for facilitating secure cloud compute environments; and
   a processor coupled to the memory, the processor configured to execute the machine executable code to cause the processor to:
      decrypt a profile response to extract a bitstream encryption key, wherein the profile response is received from a second computing device in response to a profiling bitstream sent to the second computing device; and
      sending, to the second computing device, an application bitstream that is encrypted with the bitstream encryption key and includes a secure application package encryption key used to encrypt a secure application package stored at the second computing device.

14. The first computing device of claim 13, wherein the secure application package comprises an application, data to be used by the application, and an operating system.

15. The first computing device of claim 13, wherein the processor is further configured to execute the machine executable code to further cause the processor to store random data, wherein the profiling bitstream further includes challenge logic generated using the random data.

16. The first computing device of claim 13, wherein the processor is further configured to execute the machine executable code to further cause the processor to send the application bitstream to the second computing device when integrity check is passed, wherein the integrity check is based on a comparison of a result of an execution of the challenge logic included in the profile response to another result generated from another execution of the challenge logic using the stored random data.

17. The first computing device of claim 13, wherein the processor is further configured to execute the machine executable code to further cause the processor to lock the application bitstream based on a hardware logic identifier included in the profile response.

18. The first computing device of claim 13, wherein the profiling bitstream is configured to program a hardware logic device to only accept a subsequent bitstream encrypted with the bitstream encryption key.

* * * * *